Figure 1:
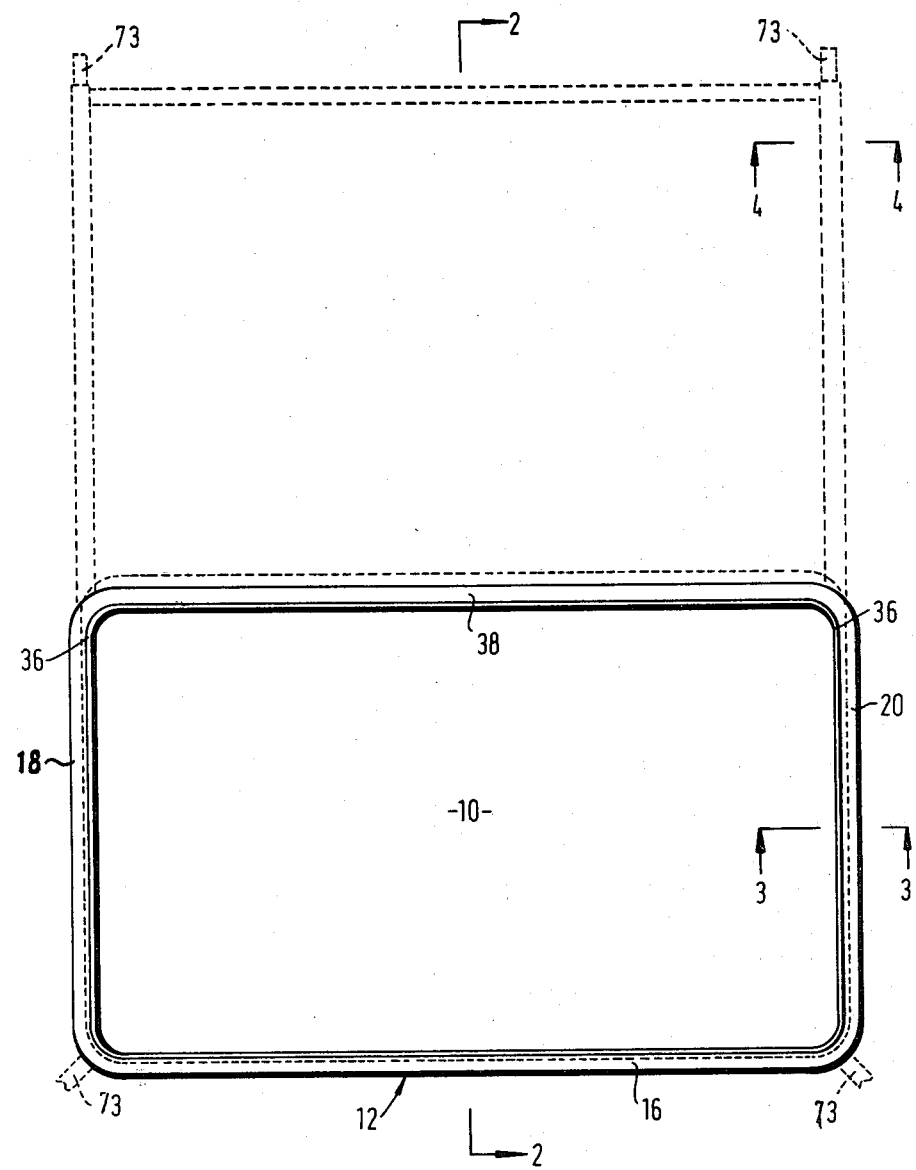

United States Patent [19]

Cunningham et al.

[11] 4,386,802
[45] Jun. 7, 1983

[54] VEHICLE SLIDING ROOF ASSEMBLY

[75] Inventors: Douglas J. Cunningham, Lutterworth; Brian S. Bennet, Coventry, both of England

[73] Assignee: Britax Weathershields Limited, Birmingham, England

[21] Appl. No.: 239,980

[22] Filed: Mar. 3, 1981

[30] Foreign Application Priority Data

Feb. 27, 1980 [GB] United Kingdom ................ 8006564

[51] Int. Cl.³ ................................................ B60J 7/04
[52] U.S. Cl. .................................... 296/213; 296/216
[58] Field of Search ............... 296/216, 217, 220, 222, 296/223, 224, 213

[56] References Cited

U.S. PATENT DOCUMENTS

| 2,193,607 | 3/1940 | Votypka | 296/220 |
| 4,298,226 | 11/1981 | Mizuma | 296/216 |
| 4,320,921 | 3/1982 | Schatzler | 296/213 |
| 4,333,680 | 6/1982 | Wolf | 296/216 |

FOREIGN PATENT DOCUMENTS 899815 6/1962 United Kingdom ................ 296/216

Primary Examiner—Robert R. Song
Attorney, Agent, or Firm—Hayes, Davis & Soloway

[57] ABSTRACT

A sliding roof assembly for a vehicle has a glass sliding panel 10 mounted in a pair of mutually parallel side members 20 each having an integral drain channel 26. An inwardly facing guide channel 24 is disposed on the outer wall of the drain channel 26 and engages with a respective edge of the panel 10. The side members 20 extend below the vehicle roof so that the panel 10 extends below the vehicle roof when in its open position. A second guide channel 54 is formed on the inner side wall of the drain channel 26 and has a sun blind 34 slidably mounted therein.

4 Claims, 4 Drawing Figures

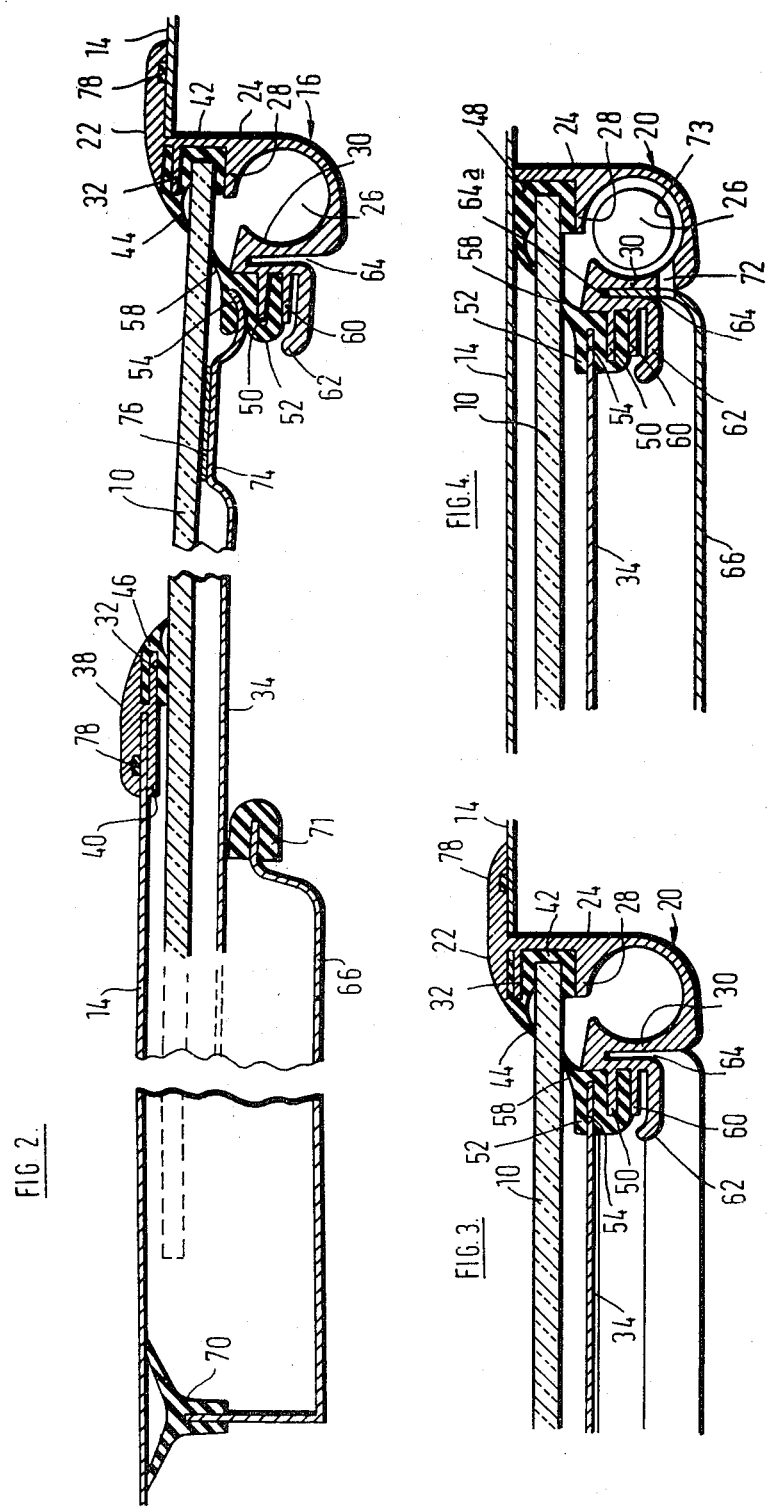

VEHICLE SLIDING ROOF ASSEMBLY

This invention relates to sliding roof assemblies for vehicles, commonly called sunshine roofs.

In known sliding roof assemblies, a panel is mounted in a frame so as to be slidable between a position in which it closes an opening in the vehicle roof and a position in which such opening is exposed. The frame includes tracks along two opposite sides on which the panel is carried by means of rollers or sliders. The extent to which the overall thickness of the assembly can be minimised is limited by these rollers or sliders and by the tracks.

G.B. Specification No. 1311007 discloses a sliding roof assembly in which the edges of the panel are directly received in guide channels in a pair of mutually parallel side members. However, when in its open position, the panel is exposed to view above the vehicle roof which consequently has to be specially shaped to accommodate the sliding roof assembly. The present invention is concerned with the provision of a sliding roof assembly of minimum overall thickness with the panel disposed below the vehicle roof when in its open position and which requires no modification of the vehicle roof other than the mere cutting of the required aperture.

According to the invention, a sliding roof assembly for a vehicle comprises a panel formed of sheet material and slidable between a closed position in which it closes an aperture in the vehicle roof and an open position adjacent to said aperture, the panel being mounted in a pair of mutually parallel side members, each side member having an inwardly facing guide channel engaging with a respective edge of the panel, each side member extending below the vehicle roof so that the panel extends below the vehicle roof when in its open position, and each side member including an integral drain channel, the guide channel being disposed on the outer wall of the drain channel.

The panel may consist of a sheet of transparent material such as glass. Alternatively, it may be formed of sheet metal. In the latter case, some stiffening of the panel may be necessary but any such stiffening is confined to the central region of the panel away from the part thereof which engages in the slider channel members. Alternatively, the panel may be constructed of two layers of sheet metal and, in this case, the parts of the panel which engage in the panel member have the two layers of sheet metal in close abutment with one another.

When the panel is formed of transparent material, a second guide channel may be provided on the inner side wall of the drain channel of each side member in order to support a second, opaque panel which serves as a sun blind.

An embodiment of the invention will now be described, by way of example, with reference to the accompanying drawings in which;

FIG. 1 is a plan view of a sliding roof assembly in accordance with the invention, FIG. 2 is a cross sectional view taken on the line 2—2 in FIG. 1, FIG. 3 is a cross sectional view taken on the line 3—3 in FIG. 1 with the sliding panels in the closed position, and FIG. 4 is a cross sectional view taken on the line 4—4 in FIG. 1 with the sliding panels in the open position.

The drawings show a sliding roof assembly comprising a sliding glass panel 10 mounted in a frame 12 which is fitted into an opening in a vehicle roof 14. The front and side elements of the frame 12 are formed by a central element 16 and side limbs 18 and 20 respectively of a U-shaped member of extruded aluminium. As can be seen from FIG. 2, this extrusion has an upper part of T-shaped cross section, having one side of its cross bar 22 overlying the vehicle roof 14 and its stem 24 projecting downwardly adjacent to the edge of the opening. The lower part of the extrusion comprises a drain channel 26 of circular cross section having an opening defined by limbs 28 and 30, the limb 28 being a continuation of the stem 24, the limb 28, together with a web 32 disposed just below the level of the vehicle roof 14, defines a channel for receiving an edge of the panel 10. The limb 30 supports a formation for engagement with a sliding sun blind 34 (FIG. 2), as will be described hereinafter.

The cross sections of the front portions of the side limbs 18 and 20, which bound the side edges of the opening in the vehicle roof 14, are identical with that of the central element 16. However, as can be seen from FIGS. 1 and 4, the side limbs 18 and 20 project rearwardly under the vehicle roof 14 and, at these projecting ends, the stem of the T-shape is cut level with the bottom of the web 32, i.e. just below the vehicle roof 14, the cut away portion starting at points 36 (FIG. 1).

The rear edge of the opening in the vehicle roof 14 is bounded by a member 38, formed from extruded aluminium, which, as can be seen from FIG. 2, has a cross section above the level of the vehicle roof identical with that of the part of the extrusion forming the elements 18 and 20 which is cut away, i.e. the web 32 and above, together with a web 40 which engages with the underside of the vehicle roof 14.

The channel defined by the limb 28 and the web 32 is lined with a seal member 42, which engages between the web 32 and the cross bar 22 of the T-shape, and with a lip 44 which engages with the upper surface of the glass panel 10. As can be seen from FIG. 2, the rear frame member 38 carries a seal 46 similar to the upper part of the seal member 42 while, as can be seen from FIG. 4, the parts of the limbs 18 and 20 projecting behind the points 36 are provided with seal members 48 similar to the lower part of the seal member 42. The seal members 42, 46 and 48 are formed of rubber or similar material, the parts thereof which embrace the edge of the glass panel 10 being felt-faced.

The limb 30 of the drain channel carries a horizontal web 50 which is received in a groove in a second seal member 52. The seal member 52 has a channel 54, for supporting the sun blind 34, and a lip 58 which engages with the lower surface of the glass panel 10. Below the web 50 are two further webs 60 and 62 defining a groove for receiving a wedge (not shown) for securing the fabric interior trim of the vehicle along the front and side edges of the opening in the roof 14.

A groove 64 is formed between the limb 30 and the webs 50, 60 and 62. As can be seen from FIG. 4, this groove 64 serves to receive the upturned edge of a drain tray 66 which is disposed under the vehicle roof 14 behind the opening therein and serves to receive any water which succeeds in passing the seal 46 and falls off the rear edge of the glass panel 10. An "O" type seal 68 is provided at the top of the groove 64. The rear edge of the drain tray 66 is sealed to the under-surface of the vehicle roof 14 by a Y-shaped double lip seal 70 (FIG.

2). The front edge of the drain tray 66 is provided with a clip 71 for use in securing the edge of the interior fabric trim of the vehicle along the back of the opening. In order to permit water to escape from the drain tray 66, holes 72 are drilled through the edge thereof and the abutting part of the limb 30 of the drain channel 26, below the web 62, at each of the back corners of the drain tray. Drain tubes 73 lead from the four corners of the drain channel 26 down through the vehicle quarter pillars in a conventional manner.

When the roof is to be opened, the sun blind 34 and the glass panel 10 slide rearwardly in their respective channels formed in the seal members 24 and 52 to a position above the drain tray 66. When the roof is closed, the leading edges of the panel 10 and sun blind 34 engage in the parts of the seals 52 and 42 respectively mounted on the central portion 16 of the U-shaped member. If desired, the sun blind 34 can be opened and the glass panel 10 left closed. In order to prevent any water which may collect on the top of the sun blind 34 from leaking under the front edge thereof into the interior of the vehicle, a ridge 74 is formed across the front edge of the blind 34 and carries a strip 76 of synthetic foam material for engagement with the lower surface of the glass panel 10.

An "O" type seal 78 is provided in a groove formed in the lower surface of the T-shaped portion of the members 16, 18 and 20 and the corresponding part of the member 38.

In order to drain any water which collects above the front corners of the glass panel 10 when it is in its closed position and the vehicle is stationary, slots (not shown) are cut through the seal 42 at each end of the central portion 16 so that such water can drain into the channel 26. When the vehicle is in motion the resulting draught tends to draw water away from these corners of the roof.

I claim:

1. A sliding roof assembly for a vehicle comprises a panel formed of sheet material and slidable between a closed position in which it closes an aperture in the vehicle roof and an open position adjacent to said aperture, a pair of mutually parallel side members, a respective drain channel integral with each of said side members, and an inwardly facing guide channel formed on the outer wall of the drain channel of each of said side members and engaging with a respective edge of the panel, the side members extend below the vehicle roof so that the panel extends below the vehicle roof when in its open position.

2. A sliding roof assembly according to claim 1, wherein a seal member is mounted on the inner wall of the drain channel and engages with the lower surface of the panel.

3. A sliding roof assembly according to claim 1, wherein a second guide channel on the inner side wall of the drain channel of each side member and a second panel is slidably mounted in the second guide channels.

4. A sliding roof assembly according to claim 3, wherein a drain tray is secured to the bottom of the side members and extends below the first and second panels when in their open positions and a respective duct leads from the drain tray to the drain channel in each side member below the level of the second guide channel.

* * * * *